United States Patent [19]

Bowersox

[11] Patent Number: 4,655,806
[45] Date of Patent: Apr. 7, 1987

[54] DUST SEPARATOR

[75] Inventor: Thomas E. Bowersox, Phoenix, N.Y.

[73] Assignee: Griffin Environmental Company, Inc., Syracuse, N.Y.

[21] Appl. No.: 812,133

[22] Filed: Dec. 23, 1985

[51] Int. Cl.⁴ .............................................. B01D 46/02
[52] U.S. Cl. ................................ 55/341 NT; 55/302; 55/341 R; 55/410; 55/432
[58] Field of Search .................... 55/96, 97, 293, 302, 55/303, 341 R, 341 NT, 378, 413–416, 410, 432

[56] References Cited

U.S. PATENT DOCUMENTS

| | | | |
|---|---|---|---|
| 2,976,953 | 3/1961 | Haas et al. | 55/341 PC |
| 2,982,532 | 5/1961 | Hakes | 55/341 NT |
| 3,095,289 | 6/1963 | Egan | 55/96 |
| 3,097,410 | 7/1963 | Lincoln | 55/378 |
| 3,177,636 | 4/1965 | Jensen | 55/341 NT |
| 3,325,979 | 6/1967 | Smith | 55/96 |
| 3,396,516 | 8/1968 | Ballard | 55/302 |
| 3,614,862 | 10/1971 | Connors | 55/347 |
| 3,937,621 | 2/1976 | Gravley | 55/381 |

Primary Examiner—Bernard Nozick
Attorney, Agent, or Firm—Bruns and Wall

[57] ABSTRACT

A dust separator including a cylindrical housing that is separated by a pair of spaced apart tube sheets into an upper incoming air distributor, an intermediate tube compartment and a lower settling chamber. Large diameter air permeable filter tubes are suspended between the tubes to conduct airborne particles and dust captured inside the tubes into the settling chamber. A dirty air inlet is provided in the distributor while an air outlet connected to a blower is mounted in the lower part of the tube compartment. The blower draws air from the distributor through the tube walls so that the air is cleansed of airborne materials. A perforated control baffle is placed in front of the discharge opening to provide for a uniform and even flow of air through the tubes.

18 Claims, 6 Drawing Figures

DUST SEPARATOR

BACKGROUND OF THE INVENTION

This invention relates to a dust separator and, in particular, to an improved industrial dust separator capable of handling high inlet flow rates of light density materials, such as saw dust, paper dust and grain dust.

More specifically, this invention relates to a dust separator that utilizes a series of filter tubes for removing dust and other particulate materials from a high velocity airstream of process gas.

Dust collectors employing a plurality of filter bags are well known and used in the art for removing many kinds of airborne pollutants and contaminants from environmental air and other types of gases. Such collectors are manufactured by Griffin Environmental Co., Inc. of Syracuse, New York under the trade name Jet-Aire. In this type of installation, a series of elongated cylindrical air permeable filter bags are suspended from a tube sheet within an airtight housing. Contaminated air is brought into the bottom of the housing and allowed to flow upwardly towards an upper discharge opening above the tube sheets. The airstream is thus caused to flow inwardly through the filter bags before exiting the housing. Airborne particles and dust contained in the airstream are collected upon the outside surface of the filter bags. These particles agglomerate on the bag surfaces and, if not removed by some means, block the filters thereby adversely effecting the throughput and efficiency of the unit.

Material collected on the outside of the filter bags is generally removed by pulsing a reverse flow of high velocity air downwardly into the tubes. An air header is suspended over the bag openings which contains a series of nozzles for directing high velocity air directly into each bag. The air velocity is high enough to dislodge the accumulated particles from the outside surface of the bags and drive them downwardly into a hopper from which they are transported out of the system.

These multiple bag collectors have proven to be reliable units in the field. However, because of the upwardly directed flow pattern through the unit, the loading capacity of the filters is generally limited to between two and seven cfm of entering air for each square foot of filter bag area. Accordingly, the maximum upward flow rate that the unit can handle is generally restricted to about three hundred feet of air per minute. At these relatively low flow velocities, fine particles, such as sawdust, paper fibers and the like, have a tendency of collecting in static pockets throughout the bag housing and oftentimes build up to a point where the accumulated material bridges the gap between the bags. Once this happens, the flow through the housing is greatly reduced and will remain so until such time as the bridge is removed.

It should be further noted that these "reverse flow" prior art collectors require additional equipment and controls to periodically blow down the filter bags. Each bag must be supported internally with a wire mesh cage to prevent it from being collapsed by the process air that is being drawn inwardly. Typically, the cages are about eight feet long and added headspace must be provided to facilitate their installation and removal. Finally, in these reverse flow units the blower is generally connected to the top of the unit by lengthy airtight ducts, thereby increasing the load demands on the blower motor.

Some units known as "afterfilters" are used in conjunction with larger separators to clean fine particles or dust from the exhaust emitted by the larger unit. The dust laden air or gas is typically drawn through closely packed filter tubes so that the fine particles are collected on the inside of the tubes. The fine particles tend to clog the filter pores and build up along the inside surfaces of the tubes again forming bridges inside the tubes. Mechanical shakers are used to break up and dislodge the agglomerates. Tube shakers are complex devices involving electrically controlled motors that are coupled to the tubes by various types of mechanical linkages. These devices are space consuming and relatively expensive to install and operate.

SUMMARY OF THE INVENTION

It is therefore an object of the present invention to improve dust collectors suitable for use in cleaning environmental air or various types of industrial gases.

It is a further object of the present invention to increase the throughput of a dust collector utilizing a plurality of filter tubes without increasing the size of the unit or sacrificing its efficiency.

Yet another object of the present invention is to reduce the amount and cost of equipment utilized in an industrial type dust collector for cleaning environmental air or any other types of industrial waste gases.

A still further object of the present invention is to eliminate the need for mechanical shakers in separators used to clean dust and other finely divided particles which form an entraining air stream.

Another object of the present invention is to reduce the power requirements of a continuous duty dust collector utilizing a blower to draw contaminated air through a filter tube compartment.

Yet another object of the present invention is to provide a filter tube dust collector capable of handling extremely high input velocities of dirty air.

These and other objects of the present invention are attained by means of a separator for removing particulate materials containing high concentrations of dust from a high velocity stream of dirty air that includes an airtight, preferably cylindrical, housing having horizontally disposed upper and lower tube sheets that are vertically spaced within the housing to establish a filter tube compartment between the tube sheets, a plurality of relatively large diameter filter tubes secured in parallel alignment between the tube sheets with the tubes extending between an upper incoming air distributor and a lower settling chamber, a blower is connected to the lower part of the tube compartment to draw air from the air distributor through the walls whereupon entrained particles and dust are captured inside the tubes and are forced downwardly into the settling chamber by both gravity and the downwardly moving flow thereby keeping the tube surfaces continuously free of excess dust without the aid of pneumatic blow down systems or mechanical shakers. A perforated control baffle is mounted in front of the air discharge opening which provides for uniform distribution of air within the tubes.

BRIEF DESCRIPTION IF THE DRAWINGS

For a better understanding of these and other objects of the present invention, reference is had to the following detailed description of the invention which is to be read in conjunction with the accompanying drawings; wherein FIG. 1 is a side elevation with portions broken away of a typical filter bag dust collector found in the prior art that utilizes a pneumatic blow down system to keep the filter bags clean;

DESCRIPTION OF THE INVENTION

PRIOR ART

Figure 1:
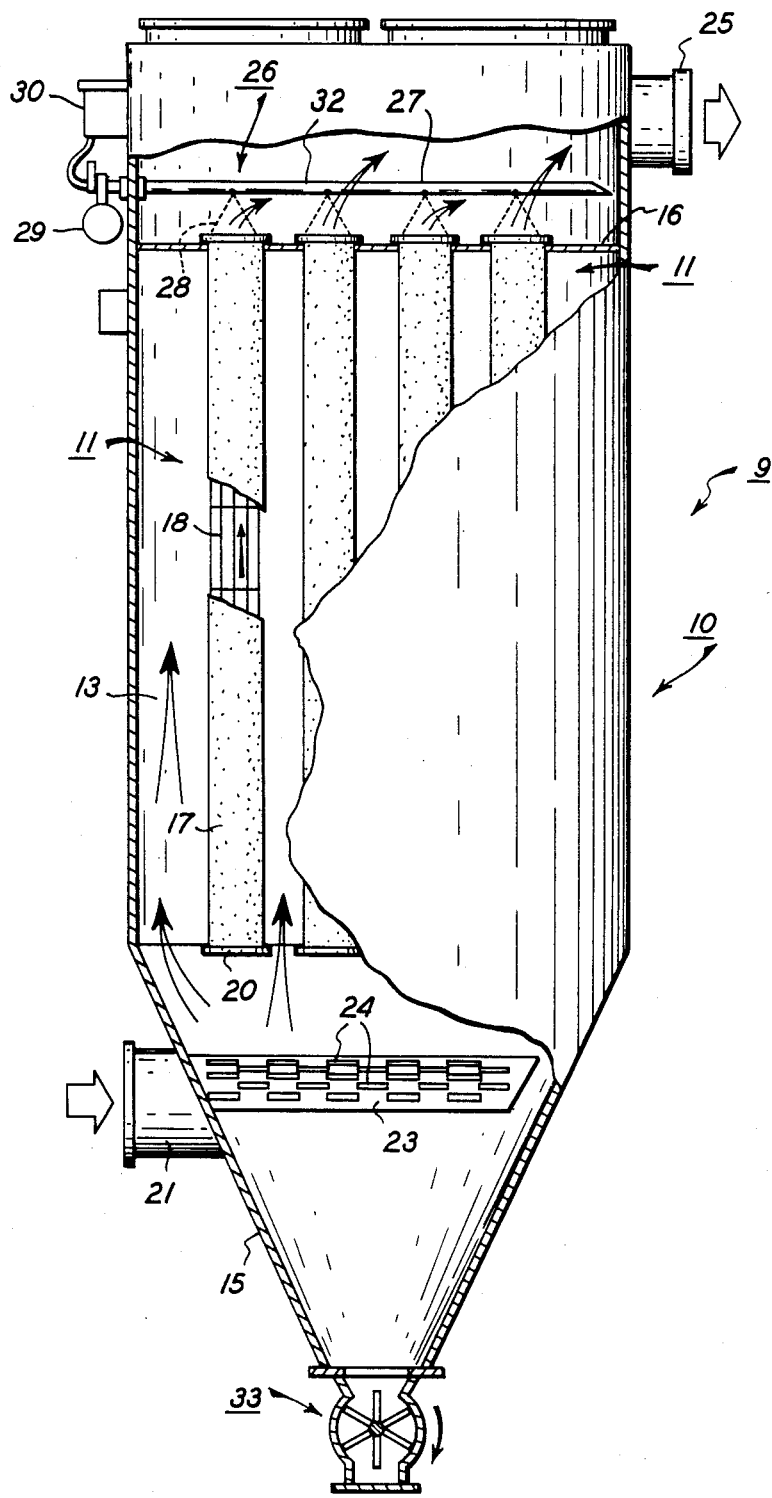

Turning initially to the drawings, and in particular to FIG. 1, there is shown a prior art "jet pulse" collector unit, generally referenced 9 that employs a series of filter bag assemblies 11—11 for removing particulate material from air, or other types of industrial gases, within an airtight housing 10. For the purposes of this disclosure, the term air will be used to describe the process gas, however, it should be clear that the term as herein used is broad enough to cover all kinds of dirty gases generally treated in this type of installation. The unit includes an upper clear air plenum 12, a bag compartment 13, and a lower funnel-shaped hopper 15. The filter bag assemblies are hung vertically from a tube sheet 16 that isolates the clean air plenum from the bag compartment. The bags are suspended over the open hopper in assembly. Each bag is made of an air penetrable fabric 17 that is mounted over a cylindrical wire cage 18 to support the bag in a vertical position within the bag compartment. The upper end of each bag assembly opens into the clean air plenum through the tube sheet. The lower end of each bag, however, is closed by means of an end cap 20 or any other suitable means to prevent material collected in the open hopper from entering the bag.

Contaminated or dirty air is brought into the housing by means of an inlet pipe 21 which empties directly into the hopper region immediately beneath the bag assemblies. A baffle 23 having slotted holes 24—24 formed therein serves initially to treat the incoming airstream to separate the larger size particles from the flowstream and to evenly distribute the incoming stream across the housing. An outlet pipe 25 is connected to the clean air plenum at the upper part of the unit. Although not shown, the outlet pipe is coupled to a blower by means of a relatively long airtight exhaust duct. The blower initially pulls the incoming air from the hopper region upwardly into the housing around the bag assemblies. The air passes into the bags through the permeable fabric and the solids entrained therein are collected on the outside surfaces of each sleeve. The treated air enters the sleeve and is conducted upwardly into the clean air plenum and then discharged from the unit.

Most prior art units of this type generally employ eight foot long bag assemblies which can handle about two to seven cubic feet per minute of contaminated air for each square foot of available filter cloth area. At higher flow rates, the surface loading on the bag surfaces usually becomes excessive and the efficiency of the unit drops off dramatically.

As dust and other particulate materials collect upon the outside surface of the bags, it must be periodically dislodged in order to maintain operating efficiency. Bag cleaning is accomplished by mechanical bag shakers or pneumatic blow down systems or combinations thereof. A high pressure blow down system 26 is shown suspended over the open ends of the bag tube within the clean air plenum. The system includes a series of horizontal headers 27 that are coupled to an air compressor (not shown) through means of an electronic control valve 29. The operation of the control valve is regulated from a control panel 30 to periodically open the valve whereupon a stream of high pressure air is issued from nozzles 32—32 directly into the bag assemblies. Sufficient velocity is provided to the cleaning airstream to drive accumulated particles from the outside surfaces of the bags. The reverse flow of air drives the particulate material downwardly into the hopper region where it is ultimately delivered into a rotary air lock 33. A suitable conveyor is coupled to the air lock to transport the collected materials out of the unit.

PREFERRED EMBODIMENT OF THE INVENTION

Referring now more specifically to FIGS. 2-6, there is shown a separating unit 40 that embodies the teachings of the present invention. This improved unit includes an airtight cylindrical housing 41 which has three main sections consisting of an entering air distributor, 42, a filter tube compartment 43 and a settling chamber 44. The tube compartment is separated from the air distributor by means of an upper tube sheet 45 and from the settling chamber by means of a lower tube sheet 46. As will be explained in greater detail below, a series of parallel cylindrical filter tubes 51—51 are vertically aligned between the tube sheets. The tubes pass through openings formed in the sheets and serve to place the air distributor in direct communication with the settling chamber.

Figure 2:
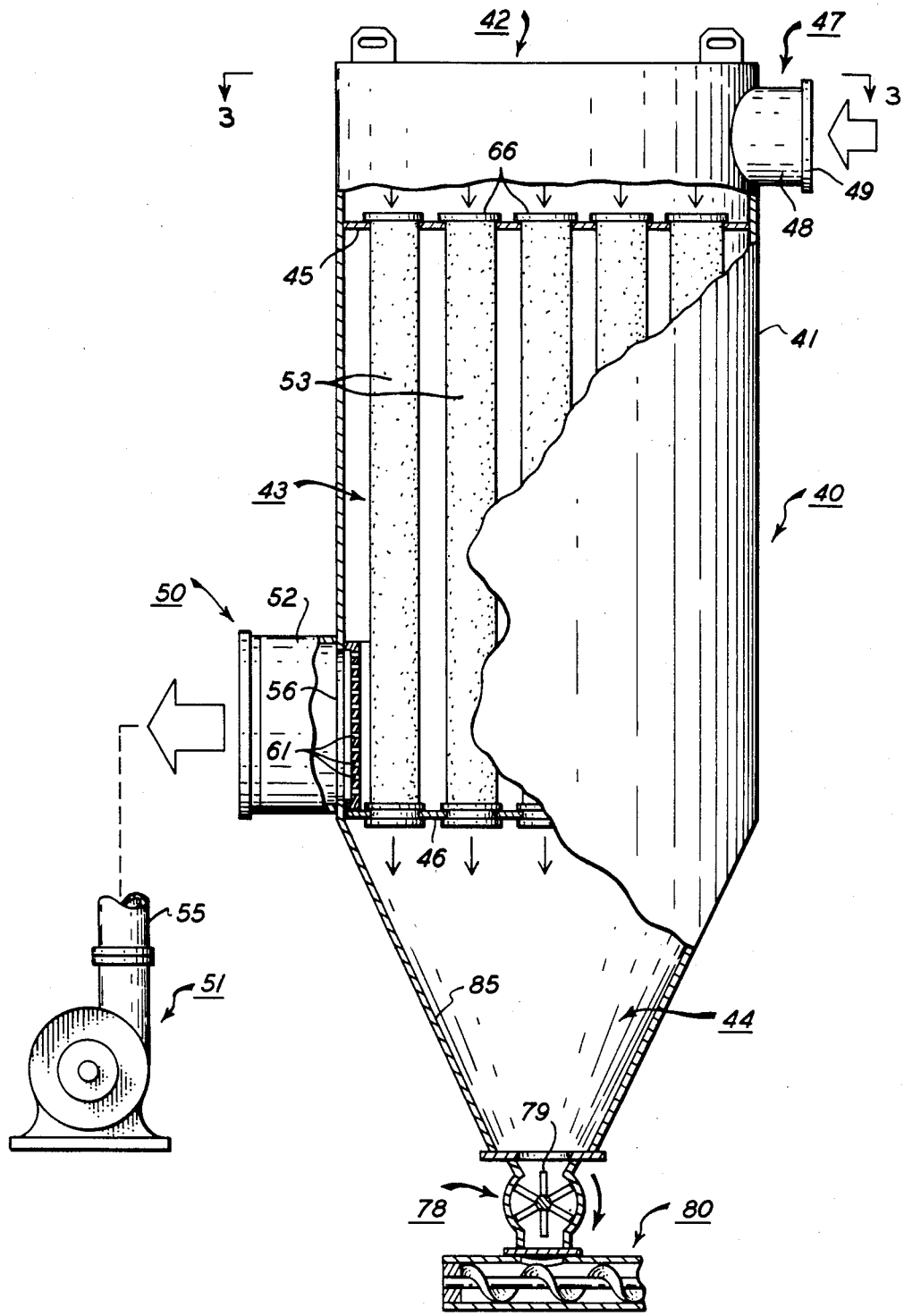
FIG. 2 is a side elevation with portions broken away of a separator which embodies the teachings of the present invention wherein contaminated incoming air or gas is cleaned by distributing the air downwardly through a series of large diameter filter tubes.
Figure 3:
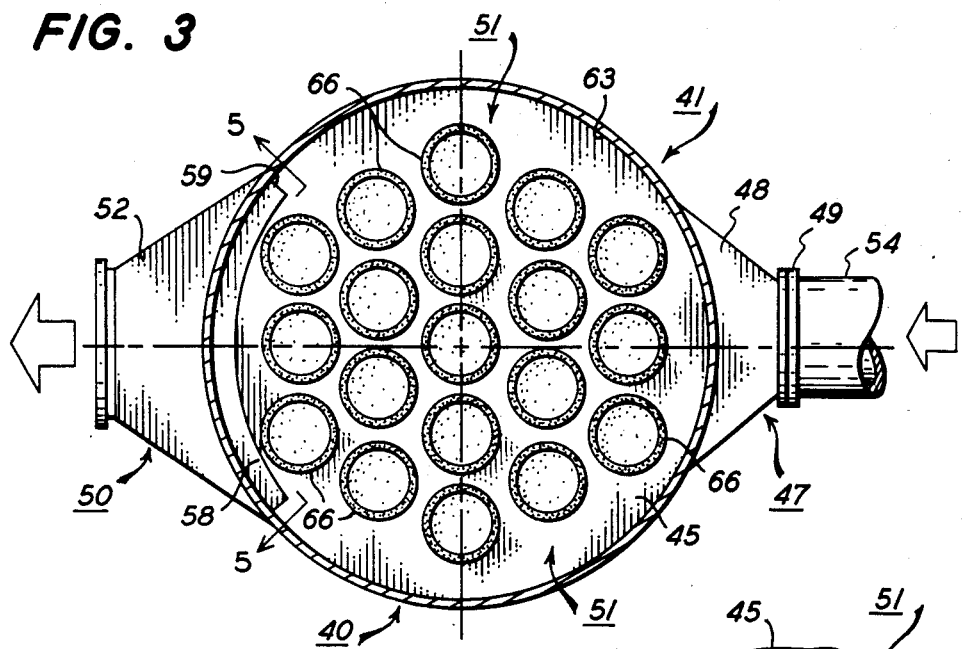
FIG. 3 is a top sectional view of the unit shown in FIG. 2 taken along lines 3—3 in FIG. 2.
Figure 4:
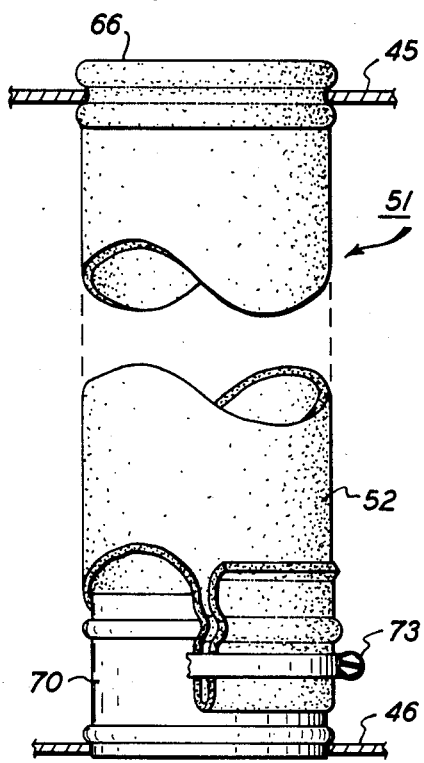
FIG. 4 is an enlarged partial side view of one of the filter tube assemblies used in the present invention.

An air inlet 47 is joined to the air distributor as shown in FIG. 2. The inlet includes an expanding transitional piece 48 and a flange 49. As shown in FIG. 3, the flange is coupled to an inlet pipe 54 which supplies contaminated air to the distributor. The expanded transition piece acts as a nozzle to reduce the velocity of the incoming air so that it is spread evenly over the tube entrances thus assuring uniform loading of the tubes. An air outlet 50 is connected into the lower section of the tube compartment and is coupled to the suction end by a blower shown generally at 51 by suitable ducting 55. An air outlet includes a tapered transition piece 52 for increasing the outlet velocity of the airstream after it has moved through the air discharge opening 56.

Dirty air is introduced initially into the air distributor located over the top of the filter tube assemblies 53—53. Under the influence of blower 51, the air is drawn uniformly into the tubes and is carried downwardly toward the settling chamber. The tubes are made of an air permeable fabric having smooth finished membranes which permits incoming air, but not airborne particles and dust, to pass through the fabric into the tube compartment. Preferably, the tubes are fabricated of either a synthetic or natural fiber. The inside of each tube is treated by the application of a smooth finish coating, typically an acrylic, which presents a low friction wall to the dust and the like moving down the tube. Dirty air moving down the inside of the tubes is thus separated from dust and other particles, with the air passing through the filter fabric and the particles remaining behind on the inside of the tubes. The velocity of air moving downwardly through the tubes is sufficiently high to continually strip the particles from the tube walls. The stripped particles fall under the influence of gravity and the airflow into the settling chamber. The drop-out velocity of the particles falling into the settling chamber is about equal to the velocity of contaminated air moving through the distributor.

As dust and other particles move down the tubes toward the settling chamber, the mass gathers momentum as it moves downwardly and wipes any accumulation of material from the acrylic coated wall surfaces to continually clean the tubes. Because the tubes are maintained continually in a relatively clean condition, a high velocity throughput can be maintained in the present unit. Incoming downward flow velocities as high as 600 to 700 feet per minute can be efficiently treated in the present unit which is considerably higher than the upward flow rates that can be handled in most prior art devices. To handle these high flow rates, tubes having diameters of about 10 inches or more are utilized. Up to 15 cfm air for each square foot of tube surface can be efficiently cleansed in the present unit at operating efficiencies equal to pulse jet collector.

The air discharge opening 56 is formed in the housing wall adjacent to the lower tube sheet. The discharge opening is generally rectangular in form (FIG. 5) and its entrance is shielded by a perforated control baffle 58. The baffle is arcuate in shape to complement the geometry of the chamber wall. The baffle is supported a short distance away from the discharge opening by a pair of spacers 59 and 60. A series of holes 61—61 are formed in the face of the baffle to permit a controlled flow of air to enter the discharge opening. In practice, the surface area of the baffle is about 20% greater than the area of the discharge opening. The holes in the baffle face are such to restrict the straight path of outlet air and allow a higher percentage of outlet air to pass around the sides of the baffle creating a uniform distribution of air passing through the bags.

The tubes 66 are all placed in parallel rows within the cylindrical housing as shown in FIG. 3. The central row is aligned along a diameter 68 of the housing which in turn is perpendicular with a second diameter 69 that describes the axis of the discharge opening 56. The tubes in each row are staggered so that the tubes in any row are centered between two tubes in an adjacent row. Cleansed air drawn from the tubes toward the discharge opening is thus routed around the tubes with a portion of the air being directed toward the discharge opening by the curved walls of the housing. The perforated baffle, as noted above, is designed to permit the flow passing along the wall to pass around the baffle into the discharge opening. The number and size of the perforations is arranged so a higher percentage of air flows around the baffle than flows through the perforations. By maintaining this relationship, it has been found that a relatively uniform flow of air can be sustained within the tubes.

Figure 6:
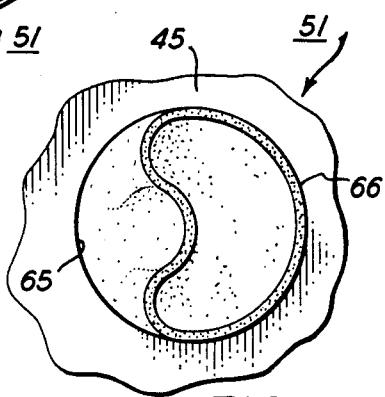
FIG. 6 is a partial top view of the top tube sheet showing one of the tubes mounted therein.
Figure 5:
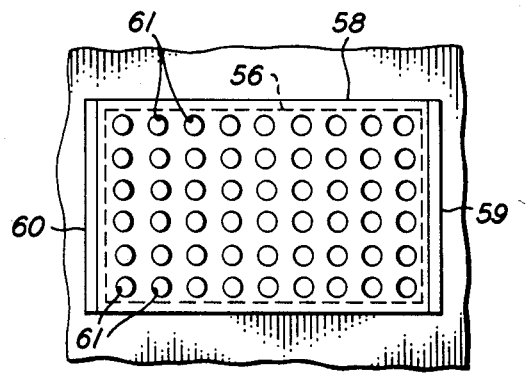
FIG. 5 is an end view of a perforated baffle used to control the flow of air through the filter bag compartment of the present unit with the view being taken along lines 5—5 in FIG. 3.

The tubes can be secured to the tube sheets by any suitable means capable of preventing them from becoming dislodged or pulling out of the tube sheets. The top end of each tube is furnished with a flexible snap band 66 that can be collapsed inside a receiving hole 65 as shown in FIG. 6. Expanding the band inside the hole locks the top of the tube in the sheet. The bottom of the tubes are passed over raised cylinders 70 (FIG. 4) secured in holes 71 formed in the lower tube sheet 46. An adjustable band 73 is used to clamp the lower end of the tube to the cylinder thus completing the assembly.

As should now be evident, the elongated filter tubes are suspended between the tube sheets so that the tubes empty directly into the settling chamber. A straight throughout flow path is thus provided for conducting dust and other materials continuously into the chamber. The air inlet nozzle provides for a smooth transition of air stream in the distributor to reduce its velocity down to about the dropout velocity of dust leaving the tubes thereby further encouraging a uniform air flow through all tubes.

An air lock 78 is located at the bottom of the settling chamber that has a multi-vaned impeller 79 for removing the collected material from the unit without disturbing the air pressure or flow patterns established inside the housing. The impeller is arranged to deliver the collected material into a screw conveyor 80 which carries it out of the system. A free drop zone and settling chamber having a height of at least four times the mean tube diameter is provided to prevent dust particles from reversing the downward flow and re-entering the dust tubes. As a consequence, the material leaving the tubes move freely into the settling chamber.

As previously noted, the diameter of the tubes used in the present unit are relatively large with a diameter of about 10 inches being preferred. The large diameter tubes coupled with the units ability to handle high flow to filter cloth ratios permit the use of relatively short tubes. Typically, a tube length to diameter ratio of about 14.5:1 can be utilized in a unit having 10 inch diameter tubes. When using 10 inch diameter tubes, a free drop zone of about 20 inches is recommended to insure that the flow pattern of material leaving the tubes does not reverse itself.

As best seen in FIG. 2, the settling chamber 44 can be funnel-shaped with the funnel tapering downwardly toward the air lock 78. Preferably, the side wall 85 of the chamber should form an angle of about 60 degrees with the horizontal plane described by the tube sheet 46. Although a funnel-shaped chamber is herein disclosed, the geometry of the chamber may take any shape without departing from the teachings of the invention provided the height of the drop zone and settling chamber is at least four times the diameter of the filter tubes.

While this invention has been described with reference to the detailed embodiments as set forth above, it is not intended to be limited to this specific structure and the invention is intended to cover any modifications or changes that may come within the scope of the following claims.

I claim:

1. Apparatus for separating particulate materials having a high concentration of dust from an air stream that includes a cylindrical vertically disposed housing having an air distributor in the top section thereof, a settling chamber in the bottom section thereof and a tube compartment between the distributor and the settling chamber, an upper tube sheet separating the distributor from the tube compartment, a lower tube sheet separating the settling chamber from the tube compartment, a series of air permeable filter tubes connected between the tube sheets, air inlet means connected to the distributor for admitting air containing a particulate material into the housing, an air discharge opening in the lower part of the bag compartment that is connected to a blower means for drawing air from the distributor through the walls of the air permeable tubes whereby air entrained materials are captured on the inside of the tubes and directed downwardly into the settling chamber, and a perforated flow-control baffle mounted in front of the air discharge opening so that a portion of the discharge air passes through the perforations and the remainder passes around the baffle.

2. The apparatus of claim 1 wherein the blower draws air through the housing at a downward velocity of between 600 and 700 feet per minute.

3. The apparatus of claim 1 that further includes an expanded transition duct connected to the distributor for reducing the entering velocity of the air to about the drop out velocity of the material falling into the settling chamber.

4. The apparatus of claim 1 wherein the interior surfaces of the tubes are coated with a low friction material to prevent dust and particulate materials from accumulating thereon.

5. The apparatus of claim 1 wherein each tube has a diameter of about ten inches.

6. The apparatus of claim 5 wherein the settling chamber and a free drop zone beneath the lower tube sheet has a vertical length greater than four times the diameter of a tube.

7. The apparatus of claim 1 wherein the tubes are mounted in rows with the tubes in one row being staggered in regard to the tubes in an adjacent row.

8. The apparatus of claim 7 wherein the tubes in the center row aligned along a diameter of the housing and the axis of the discharge opening is perpendicular to the said diameter.

9. The apparatus of claim 1 wherein the settling chamber tapers downwardly to an air lock for removing collected material from the housing.

10. The apparatus of claim 9 further including a conveyor means connected to the air lock for carrying the collected material away from the air lock.

11. The apparatus of claim 1 wherein the baffle has a surface area that is about twenty percent greater than the area of the discharge opening and complements the arcuate shape of the housing wall.

12. The apparatus of claim 11 wherein the baffle perforations are arranged to restrict the straight path of outlet air and allow a higher percentage of outlet air to pass around the baffle.

13. Apparatus for separating fine particulate material from entraining gas stream that includes a vertical housing having an upper distributor, a lower settling chamber and a tube compartment situated therebetween, an upper tube sheet separating the distributor from the tube compartment, a lower tube sheet separating the settling chamber from the tube compartment, gas permeable filter tubes extending between the tube sheets, gas inlet means connected to the distributor for admitting gas containing fine particulate material into the housing, a gas discharge means located in the lower part of the tube compartment that is connected to a blower means for drawing gas from the distributor through the walls of the gas permeable tubes whereby particulate material is captured inside the tubes and directed downwardly into the settling chamber, control means for distributing the flow gas moving through the housing uniformly through the tubes said control means having a perforated baffle mounted in spaced apart relationship in front of the gas discharge opening, whereby part of the discharge flow passes through the perforations and the remainder passes around the baffle.

14. The apparatus of claim 13 that further includes a nozzle means at the gas inlet for expanding the flow of gas entering the distributor to reduce its velocity to about the velocity of the gas moving through each of the tubes.

15. The apparatus of claim 13 wherein the inside surfaces of the tubes are coated with an acrylic type material to prevent particulate material from accumulating on the tube surfaces.

16. The apparatus of claim 13 wherein the blower means draws gas through the housing at a downward velocity of about between 600 and 700 feet per minute.

17. The apparatus of claim 13 wherein each tube has a length to diameter ratio of about 14.5 to 1.

18. The apparatus of claim 17 wherein the settling chamber and free drop zone has a vertical length that is equal to at least four times the mean diameter of the tubes.

* * * * *

UNITED STATES PATENT AND TRADEMARK OFFICE
CERTIFICATE OF CORRECTION

PATENT NO. : 4,655,806

DATED : April 7, 1987

INVENTOR(S) : THOMAS E. BOWERSOX

It is certified that error appears in the above-identified patent and that said Letters Patent is hereby corrected as shown below:

In Column 7, line 37 - insert "are" after "row".

In Column 8, line 23 - insert "of" after "flow".

Signed and Sealed this

Twenty-seventh Day of October, 1987

Attest:

DONALD J. QUIGG

*Attesting Officer*  *Commissioner of Patents and Trademarks*